(12) United States Patent
Aldrich (10) Patent No.: US 9,379,482 B2
(45) Date of Patent: Jun. 28, 2016

(54) METHOD AND DEVICE FOR GRIPPING A CABLE

(71) Applicant: Alvah Aldrich, Geneva, NY (US)

(72) Inventor: Alvah Aldrich, Geneva, NY (US)

(73) Assignee: Cooper Technologies Company, Houston, TX (US)

( * ) Notice: Subject to any disclaimer, the term of this patent is extended or adjusted under 35 U.S.C. 154(b) by 424 days.

(21) Appl. No.: 13/648,860

(22) Filed: Oct. 10, 2012

(65) Prior Publication Data

US 2013/0093143 A1   Apr. 18, 2013

Related U.S. Application Data

(60) Provisional application No. 61/546,353, filed on Oct. 12, 2011.

(51) Int. Cl.
*B23B 31/163* (2006.01)
*H01R 13/58* (2006.01)
*H02G 1/00* (2006.01)
*H01R 13/59* (2006.01)

(52) U.S. Cl.
CPC ............... *H01R 13/58* (2013.01); *H01R 13/59* (2013.01); *H02G 1/00* (2013.01); *B23B 31/16041* (2013.01); *Y10T 29/49998* (2015.01); *Y10T 279/17615* (2015.01); *Y10T 279/17666* (2015.01); *Y10T 279/1926* (2015.01)

(58) Field of Classification Search
CPC .......... H01R 13/58; H01R 13/59; H02G 1/00; Y10T 29/49998; Y10T 279/19; Y10T 279/1926; B23B 31/16295; B23B 31/16037; B23B 31/16041

USPC ................................................... 279/110, 114
See application file for complete search history.

(56) References Cited

U.S. PATENT DOCUMENTS

| | | | |
|---|---|---|---|
| 1,374,754 A * | 4/1921 | Miller ................. | B23D 77/042 279/76 |
| 3,090,614 A * | 5/1963 | Freeman et al. ............. | 269/273 |
| 4,562,329 A * | 12/1985 | Minton ................ | B23B 31/202 219/98 |
| 4,682,918 A | 7/1987 | Palm | |
| 4,693,148 A * | 9/1987 | Lobley ............................ | 82/165 |
| 5,015,023 A | 5/1991 | Hall | |
| 5,297,833 A | 3/1994 | Willis et al. | |
| 5,540,124 A | 7/1996 | Srhoj | |
| 5,775,704 A | 7/1998 | Wilson et al. | |
| 6,343,411 B1 | 2/2002 | Sigman | |
| 6,733,203 B2 | 5/2004 | Carlsen et al. | |
| 8,925,930 B2 * | 1/2015 | Komine ................. | B23B 31/20 279/42 |
| 2005/0258606 A1* | 11/2005 | Lee ............................... | 279/114 |
| 2008/0261445 A1 | 10/2008 | Malloy et al. | |

* cited by examiner

*Primary Examiner* — Eric A Gates
*Assistant Examiner* — Paul M Janeski
(74) *Attorney, Agent, or Firm* — King & Spalding LLP (57) ABSTRACT

A device for gripping a cable includes a device body, one or more gripping elements, and a gripping element housing configured to support the one or more gripping elements. The gripping element housing is rotatably coupled to the device body such that rotation of the gripping element housing relative to the device body about a longitudinal axis causes the one or more gripping elements to move radially relative to the longitudinal axis. The gripping elements may be configured such that they do not rotate relative to the gripping element housing. The gripping elements may also be configured such that they move only in a radial direction relative to the longitudinal axis, or alternatively such that they move both radially and longitudinally relative to the longitudinal axis.

17 Claims, 11 Drawing Sheets

METHOD AND DEVICE FOR GRIPPING A CABLE

CROSS-REFERENCE TO RELATED APPLICATIONS

This application claims priority under 35 U.S.C. §119 to U.S. Provisional Patent Application Ser. No. 61/546,353, titled "Method And Device For Gripping A Cable" and filed on Oct. 12, 2011, the entire contents of which are hereby incorporated herein by reference.

TECHNICAL FIELD

The present disclosure relates generally to cable connectors, and more particularly to methods and devices for gripping a cable.

BACKGROUND

Existing devices for gripping cables or cords utilize gripping elements that can be tightened or loosened around a cable or cord using screwed fasteners (screws or bolts) for adjusting the gripping elements. For example, a device may include two or three gripping elements located around a circumference of the device and connected to each other by screwed fasteners, such that when the screwed fasteners are adjusted the gripping elements are either pulled toward each other (e.g., to clamp around a cable) or pushed away from each other (e.g., to release a cable). Such devices are prone to any problems associated with using screwed fasteners, such as screws or bolts, such as the screwed fasteners stripping out upon tightening or loosening. In addition, such devices require tools for tightening and loosening the gripping elements.

SUMMARY

In accordance with the teachings of the present disclosure, disadvantages and problems associated with existing cable gripping devices have been reduced.

According to one aspect of the invention, a device for gripping a cable includes a device body, one or more gripping elements, and a gripping element housing configured to support the one or more gripping elements. The gripping element housing is rotatably coupled to the device body such that rotation of the gripping element housing relative to the device body about a longitudinal axis causes the one or more gripping elements to move radially relative to the longitudinal axis. In some embodiments, the gripping elements are configured such that they do not rotate relative to the gripping element housing. The gripping elements may also be configured such that they move only in a radial direction relative to the longitudinal axis, or alternatively such that they move both radially and longitudinally relative to the longitudinal axis.

A further aspect of the invention provides a method for gripping a cable. A cable is positioned through an opening in a gripping device that includes a device body, one or more gripping elements, and a gripping element housing rotatably coupled to the device body and configured to support the one or more gripping elements. The gripping element housing is rotated relative to the device body about a longitudinal axis, which causes the one or more gripping elements to move radially relative to the longitudinal axis.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages over the prior art are best understood by reference to FIGS. 1-12 below. However, the present disclosure may be more easily understood in the context of a high level description of certain embodiments.

The disclosure relates to an improved device for gripping a cable or other similar object. As used herein, the term "cable" refers to any one or more electrical or non-electrical cable, cord, wire, conduit, shaft, rod, or other elongated object. In general, the cable gripping devices disclosed herein include a first element that rotates relative to a second element, which causes one or more gripping elements to translate radially inward toward a cable to be gripped by the gripping elements. For example, the cable gripping device may include a device body rotatably coupled to a gripping element housing that supports a set of gripping elements (e.g., three gripping elements). Rotation of the gripping element housing relative to the device body about a longitudinal axis causes the gripping elements to be translated radially relative to the longitudinal axis. To operate such a device, a cable may be inserted through an opening in the cable gripping device, and positioned along the longitudinal axis. The gripping element housing may then be rotated relative to the device body such that gripping elements translate radially inward toward the cable, until the cable is gripped with the desired tightness.

Unlike in existing devices that use screws as the gripping elements or to tighten/loosing the gripping elements, the gripping elements of the present device are not screws, but rather translate upon rotation of the gripping element housing relative to the device body. Thus, problems associated with existing devices that use screws for tightening/loosening the cable grip, such as stripping of the screws, may be reduced or eliminated in the present device. In some embodiments, the present device may be tightened/loosened by hand without requiring any tools. Also, some embodiments may provide a frictional self-locking connection that prevents or resists the gripping elements from backing off (i.e., loosening) after being tightened around a cable.

Figure 1A:
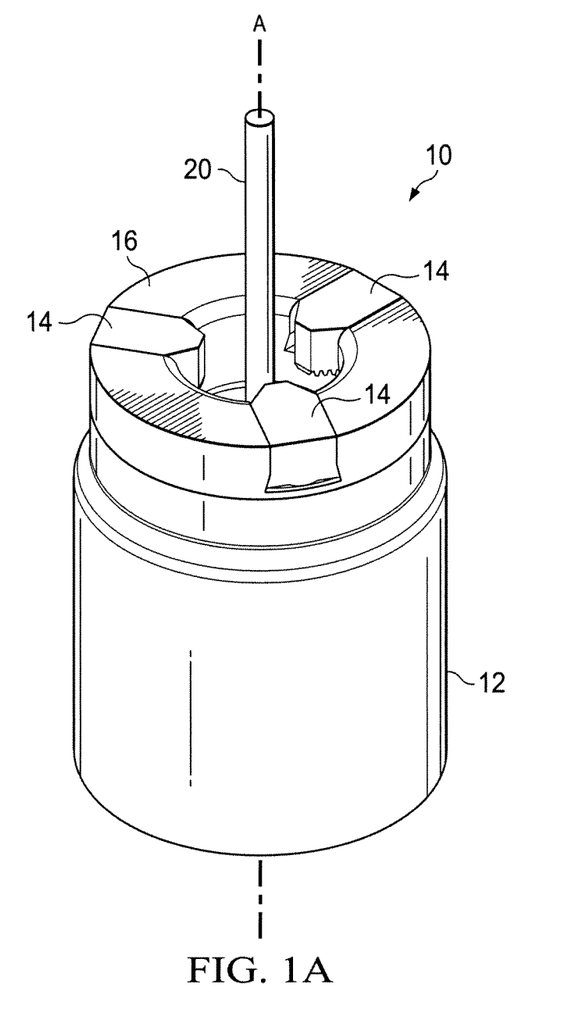
FIGS. 1A and 1B illustrate an example cable gripping device configured in non-gripping and gripping positions, respectively, according to an example embodiment of the disclosure.
Figure 1B:
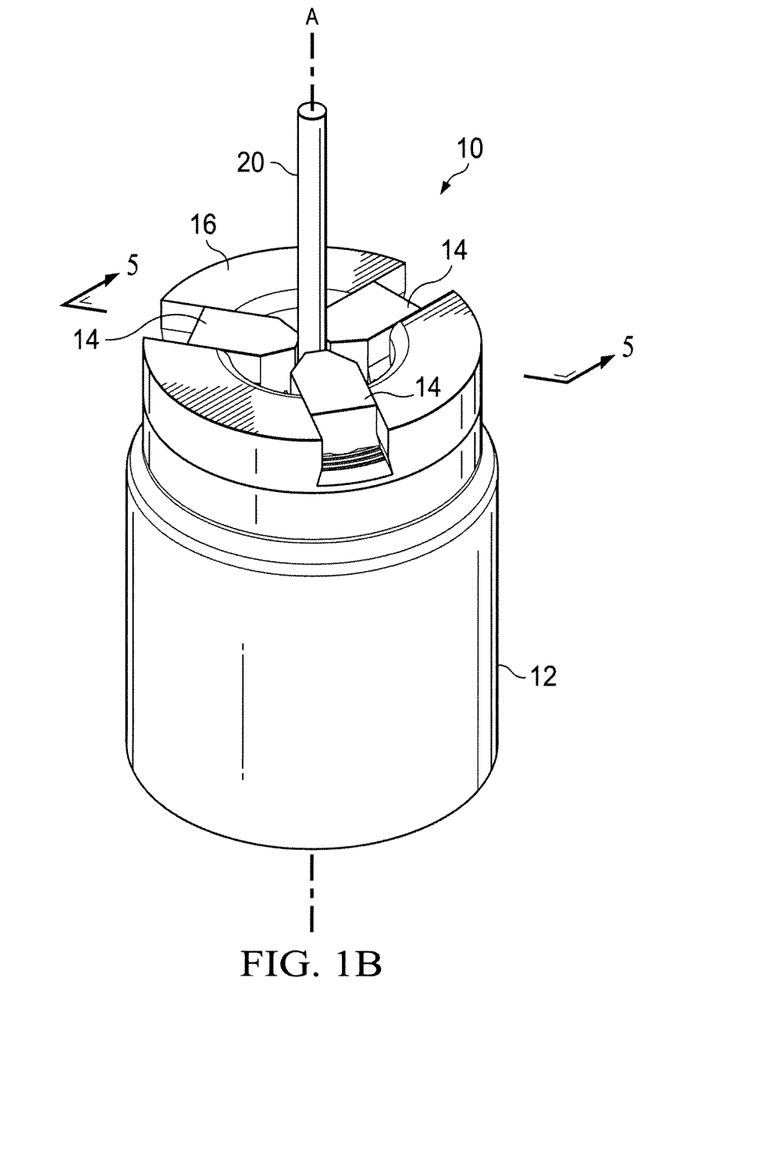

FIGS. 1A and 1B illustrate an example cable gripping device 10 configured in non-gripping and gripping positions, respectively, according to an example embodiment of the disclosure.

As shown, cable gripping device 10 includes a device body 12, gripping elements 14 for gripping a cable 20, a gripping element housing 16 that supports gripping elements 14, and a securing ring 18 for securing gripping element housing 16 to device body 12 (securing ring 18 is shown in FIGS. 2A-5). Gripping element housing 16 is rotatably coupled to device body 12 such that rotation of gripping element housing 16 relative to device body 12 about a longitudinal axis A causes gripping elements 14 to move radially inward or outward relative to longitudinal axis A. The inward/outward radial movement of gripping elements 14 relative to axis A is created by a threaded connection between a threaded surface 24 (shown, for example, in FIG. 2A) of the device body and opposing threaded surfaces 26 (shown, for example, in FIG. 2A) of each gripping element 14, as discussed in more detail below with reference to FIGS. 2A and 6.

Thus, gripping element housing 16 may be rotated relative to device body 12 in one direction to move gripping elements 14 radially inward and toward each other (e.g., to grip onto cable 20), and rotated in the opposite direction to move gripping elements 14 radially outward and away from each other (e.g., to release cable 20). Rotation of gripping element housing 16 relative to device body 12 may include rotating gripping element housing 16 while holding device body 12 in place, or rotating holding device body 12 while holding gripping element housing 16 in place, or rotating both gripping element housing 16 and device body 12 in opposite directions at the same time.

Device 10 may include any suitable number of gripping elements 14, e.g., one, two, three, four, five, six, or more gripping elements. Gripping elements 14 may be spaced around longitudinal axis A in any suitable manner. For example, gripping elements 14 may be spaced evenly around longitudinal axis A, e.g., as shown in the example embodiment in which three gripping elements 14 are spaced at 120 degree intervals. Alternatively, gripping elements 14 may be spaced unevenly around longitudinal axis A.

In some embodiments, e.g., the illustrated example, device 10 is designed to grip cable 20 only using gripping elements 14. In other embodiments, device 10 is designed to grip cable 20 between one or more gripping elements 14 and one or more other structures. For example, device 10 may include one or more gripping elements 14 located on only one side of the device, and upon rotation of gripping element housing 16 relative to device body 12, the gripping element(s) 14 move inward toward one or more structures of gripping element housing 16 or device body 12 that do not move inward/outward relative to axis A, thus enabling a cable to be gripped between gripping element(s) 14 and these other structure(s).

In the embodiment shown in FIGS. 1A and 1B, gripping elements 14 do not rotate relative to gripping element housing 16. Further, gripping elements 14 move only in a radial direction relative to longitudinal axis A (and not longitudinally relative to the longitudinal axis A) upon rotation of gripping element housing 16 relative to device body 12 about longitudinal axis A. In other embodiments, e.g., as when the threaded surface 24 is inclined or declined as shown in FIGS. 2B and 2C, gripping elements 14 move both radially and longitudinally relative to longitudinal axis A upon rotation of gripping element housing 16 relative to device body 12 about axis A.

Figure 2A:
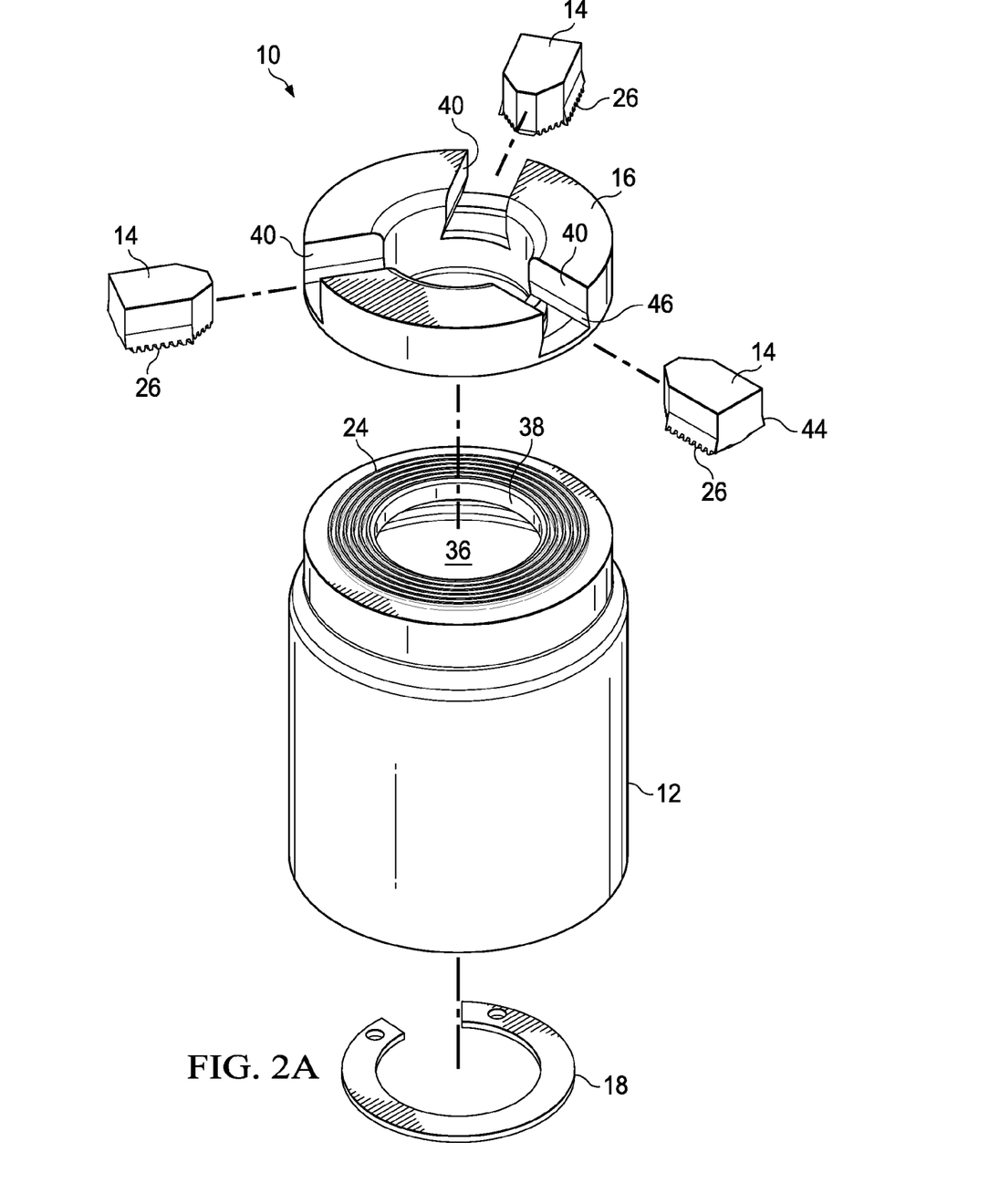
FIGS. 2A-2C illustrate various example cable gripping devices, according to an example embodiment of the disclosure.

FIG. 2A illustrates an exploded view of the example embodiment of cable gripping device 10 shown in FIGS. 1A-1B. In particular, FIG. 2A shows device body 12, gripping elements 14, gripping element housing 16, and securing ring 18 for securing gripping element housing 16 to device body 12.

Figure 3:
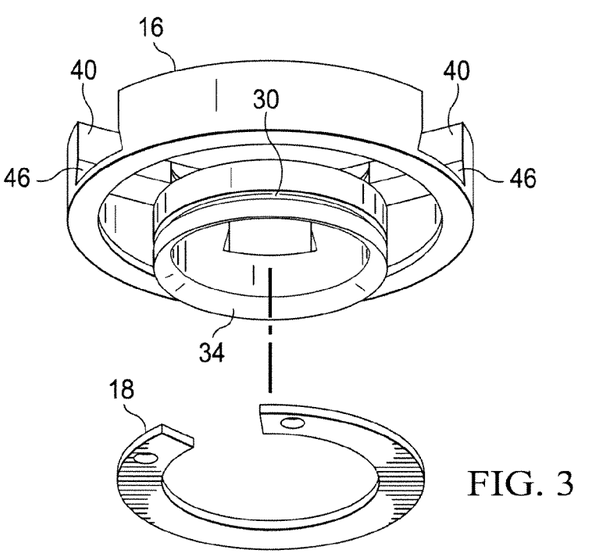
FIG. 3 illustrates a gripping element housing and securing ring of an example cable gripping device, according to an example embodiment of the disclosure.

Further, FIG. 3 illustrates gripping element housing 16 and securing ring 18 of the example embodiment of cable gripping device 10 shown in FIGS. 1A-1B. As shown, gripping element housing 16 may include a securing ring groove 30 configured to receive securing ring 18. Securing ring 18 may be configured to be manually deformed or manipulated to be fitted into securing ring groove 30. Thus, securing ring 18 may be formed from any suitable material(s) to provide a semi-rigid structure.

Figure 2B:
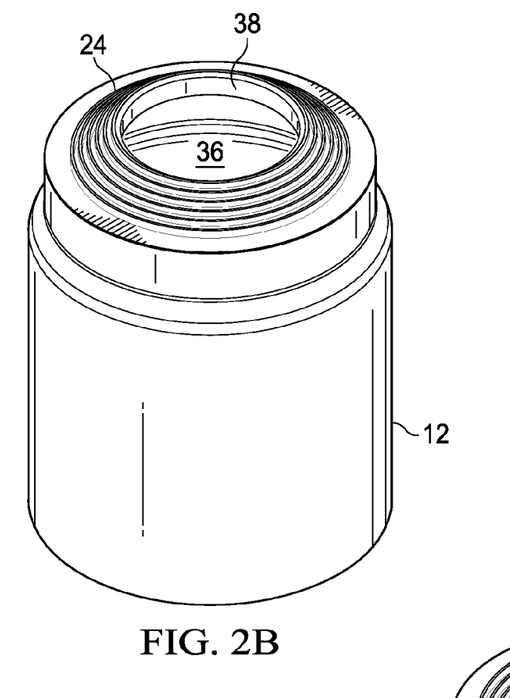
Figure 2C:
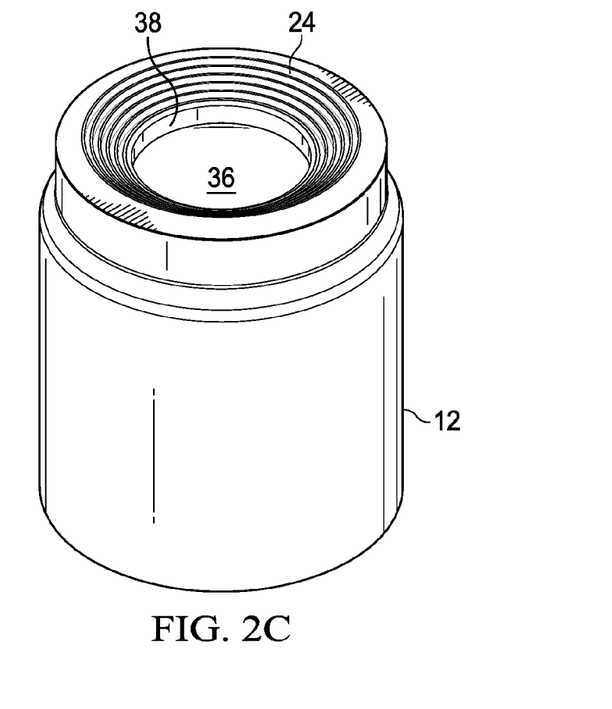

Referring to FIGS. 2A-3, to assemble device 10, a lower portion 34 of gripping element housing 16 is inserted through an opening 36 in device body 12, such that securing ring groove 30 projects beyond a flange 38 of device body 12. Securing ring 18 is then fitted into securing ring groove 30, thus securing gripping element housing 16 to device body 12 such that gripping element housing 16 can rotate relative to device body 12.

Gripping elements 14 may be inserted either before or after connecting gripping element housing 16 to device body 12. For example, gripping elements 14 may be inserted partially or fully into slots 40 formed in gripping element housing 16 before gripping element housing 16 is inserted into device body 12 and locked with securing ring 18. As another example, gripping element housing 16 may be secured to device body 12 with securing ring 18, and then gripping elements 14 may be inserted into the outer perimeter end of slots 40 in gripping element housing 16 and guided inwardly toward axis A by rotating gripping element housing 16 relative to device body 12.

As shown in FIG. 2A, device body 12 includes a planar, threaded surface 24 that defines a plane oriented perpendicular to the longitudinal axis A. Each gripping element 14 includes a corresponding planar, threaded surface 26 that interacts with threaded surface 24 of device body 12. Threaded surface 24 and/or threaded surfaces 26 may define a thread or threads arranged in a circular pattern, a spiral pattern, or any other suitable pattern to provide the desired movement of gripping elements 14. Thus, threaded surfaces 24 and 26 form a threaded connection between device body 12 and gripping elements 14, which provides the inward/outward radial movement of gripping elements 14 upon rotation of the gripping element housing 16 relative to device body 12.

In some embodiments, the threaded connection is a frictional self-locking connection such that when gripping elements 14 are tightened in a first direction, they are prevented or restricted by frictional forces from automatically releasing in the opposite direction (i.e., loosening). Thus, in some embodiments, device 10 may be hand-tightened onto cable 20, and remain tight afterwards (i.e., without becoming loosened).

In alternate embodiments, the gripping elements 14 may be moved inward and outward radially using configurations other than threaded surfaces 24 and 26. For example, threaded surface 24 can be replaced by an inclined surface (as shown in FIG. 2B) or a declined surface (as shown in FIG. 2C) along which the gripping elements 14 can move inward and outward radially. In yet another embodiment, threaded surface 24 can be replaced by a surface with threads or tracks disposed radially (as opposed to circumferentially) that permit the gripping elements 14 to move inward and outward radially. Those of skill in the art will appreciate that the gripping elements 14 can be configured in a variety of ways to achieve the desired inward and outward radial movement.

Figure 4:
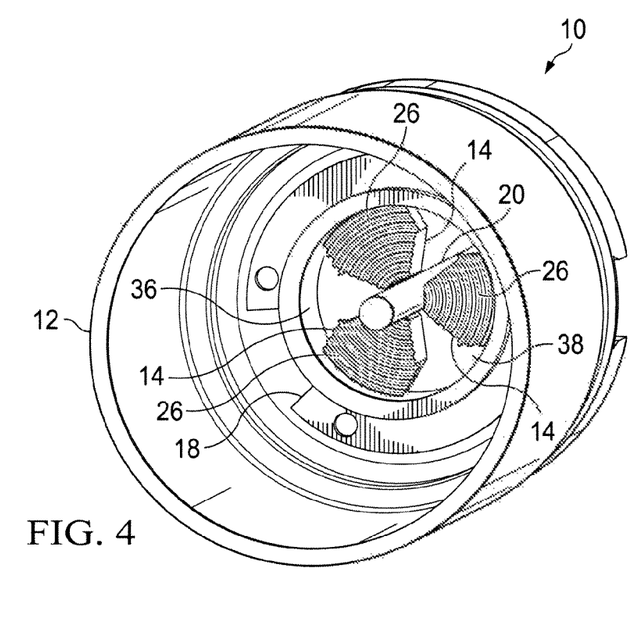
FIG. 4 illustrates a bottom view of the inside of an example cable gripping device, according to an example embodiment of the disclosure.

FIG. 4 illustrates a bottom view of the inside of the example embodiment of cable gripping device 10 shown in FIGS. 1A-1B.

Figure 5:
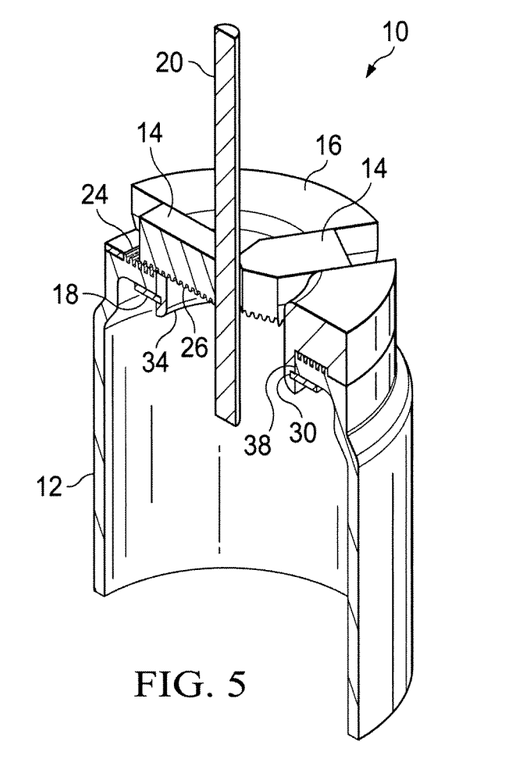
FIG. 5 illustrates a three-dimensional cross-sectional view of an example cable gripping device, taken through lines 5-5 shown in FIG. 1B, according to an example embodiment of the disclosure.

FIG. 5 illustrates a cross-sectional view of the example embodiment of cable gripping device 10 discussed above, taken through lines 5-5 shown in FIG. 1B (i.e., with gripping elements 14 located in the gripping position around cable 20). FIG. 5 shows the interaction between threaded surfaces 24 and 26 of device body 12 and gripping elements 14. FIG. 5 also shows securing ring 18 disposed below flange 38 of device body 12 and received within securing ring groove 30 formed in gripping element housing 16.

Figure 6:
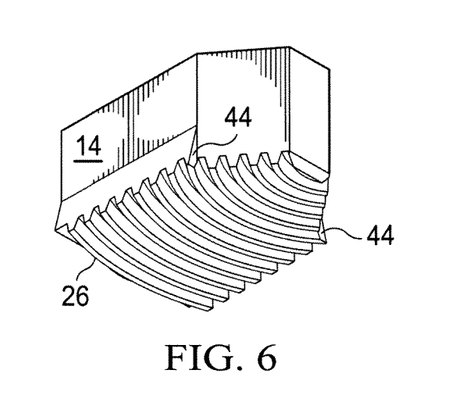
FIG. 6 illustrates an example gripping element, according to an example embodiment of the disclosure.

FIG. 6 illustrates an example gripping element 14 of the example embodiment of cable gripping device 10 shown in FIGS. 1A-1B. As discussed above, gripping element 14 includes a planar, threaded surface 26 that interacts with threaded surface 24 of device body 12. Threaded surface 26 may define one or more threads arranged in a circular pattern, a spiral pattern, or any other suitable pattern. Gripping element 14 may also include structures configured to hold gripping element 14 within gripping element housing 16. For example, in this embodiment, gripping element 14 includes lateral flanges 44 configured to engage with corresponding flanges 46 defined by slots 40 formed in gripping element housing 16 (flanges 46 are shown in FIGS. 2A and 3).

Figure 7:
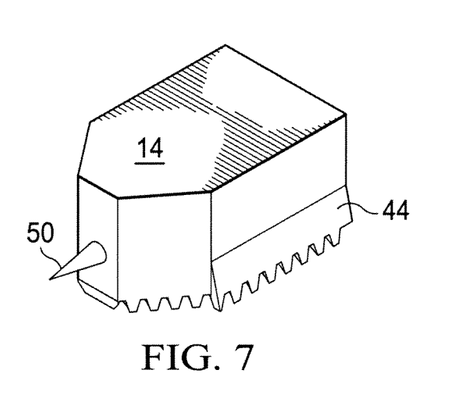
FIG. 7 illustrates another example gripping element, according to another example embodiment of the disclosure.

FIG. 7 illustrates another example gripping element 14 of the example embodiment of cable gripping device 10 shown in FIGS. 1A-1B. In this embodiment, gripping element 14 includes a piercing member 50 configured to pierce an outer coating or outer layer of the cable 20 upon tightening of the gripping element 14 onto the cable 20, e.g., to provide conductive contact with cable 20. Gripping element 14 may provide any suitable number of piercing elements, in any suitable shape and size. Further, either a single gripping element 14 or multiple gripping elements 14 may include such piercing element(s).

As discussed above, the device may include a frictional self-locking connection to prevent or resist the gripping elements from backing off (i.e., loosening) after being tightened around a cable. In addition, or alternatively, some embodiments may include other devices for preventing or resisting the gripping elements from backing off (i.e., loosening) from a tightened position around a cable and/or for preventing or resisting the gripping elements from being further tightened around the cable. For example, such devices may include a locking screw and/or a locking ring, e.g., as discussed below.

Figure 8:
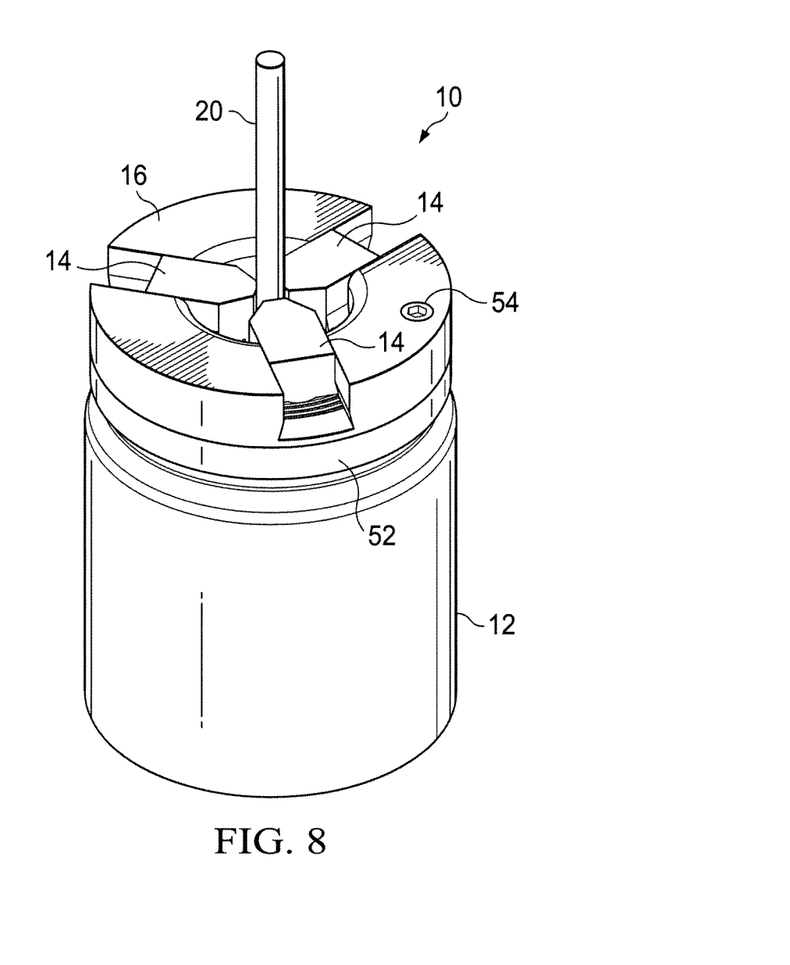
FIG. 8 illustrates an example cable gripping device including a locking screw and/or a locking ring for resisting opening or loosening of the gripping device, according to an example embodiment of the disclosure.

FIG. 8 illustrates an example cable gripping device 10 including a locking ring 52 and/or a locking screw 54 for resisting opening or loosening of gripping device 10, according to an example embodiment of the disclosure. Some embodiments may include locking ring 52, other embodiments may include locking screw 54, and other embodiments may include both locking ring 52 and locking screw 54.

Figure 9:
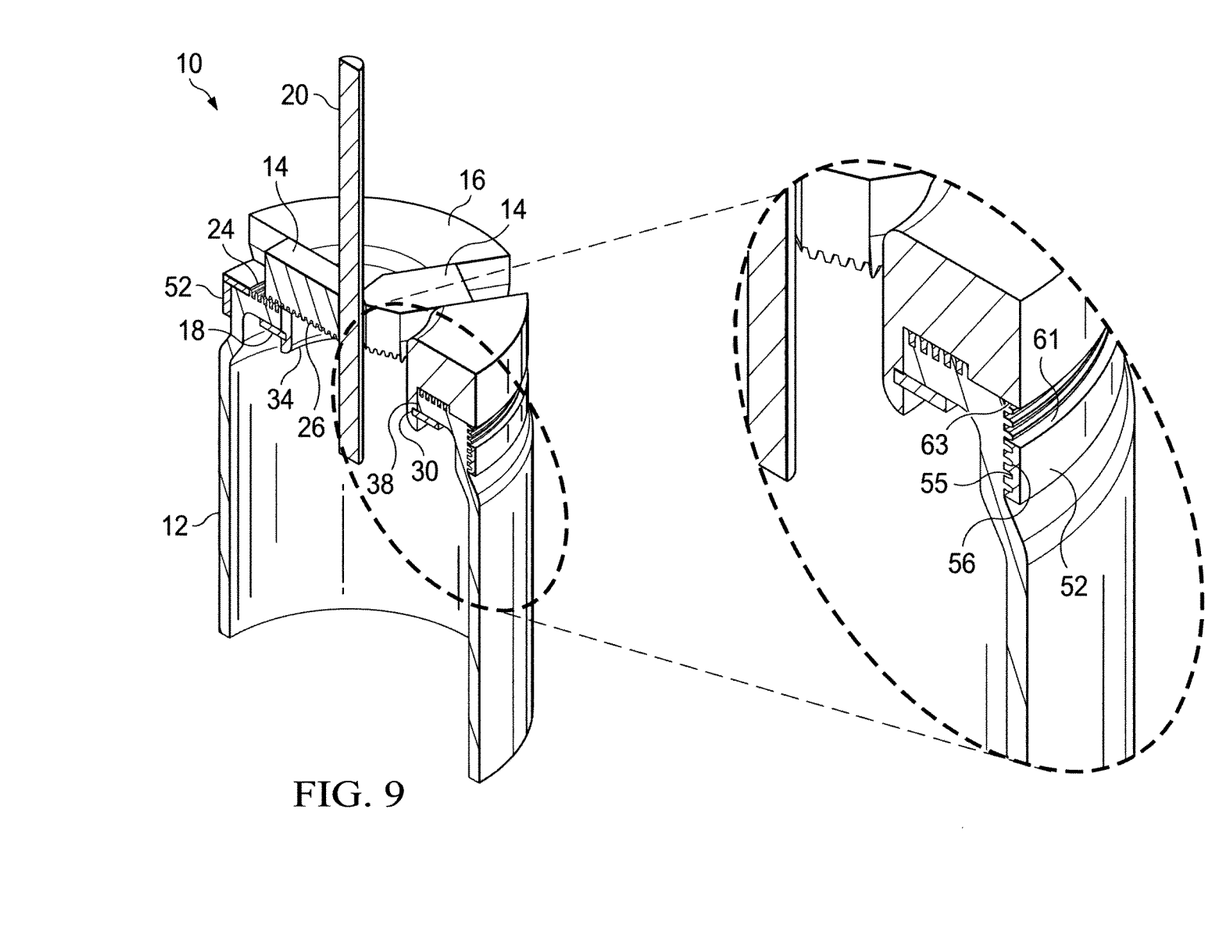
FIG. 9 illustrates a three-dimensional cross-sectional view of the example cable gripping device of FIG. 8, illustrating the locking ring for resisting opening or loosening of the gripping device.

FIG. 9 illustrate a three-dimensional cross-sectional view of example cable gripping device 10 of FIG. 8, illustrating locking ring 52 for resisting opening or loosening of gripping device 10. Similarly, FIG. 10 illustrate a three-dimensional cross-sectional view of example cable gripping device 10 of FIG. 8, illustrating locking screw 54 for resisting opening or loosening of gripping device 10.

With reference to FIGS. 8 and 9, locking ring 52 may have a threaded inner surface 55 that forms a threaded connection with a threaded outer surface 56 of device body 12. Locking ring 52 may thus be rotated relative to device body 12 to cause locking body 52 to move axially toward or away from gripping element housing 16. In particular, locking ring 52 may be tightened by rotating locking ring 52 in a first direction that moves locking body 52 axially into contact with gripping element housing 16, and further to push gripping element housing 16 upward, which may create friction or other forces between elements of device 10 (e.g., forces between securing ring 18, gripping element housing 16, and device body 12) that resist or prevent rotation of gripping element housing 16 relative to device body 12. Locking ring 52 may be loosened by rotating locking ring 52 in the oppose direction, such that gripping element housing 16 is again free to rotate relative to device body 12. In some embodiments, an upper surface 61 of locking ring 52 and/or a corresponding mating surface 63 of gripping element housing 16 may be roughened, knurled or otherwise contoured to provide increased friction between locking ring 52 and gripping element housing 16.

Figure 10:
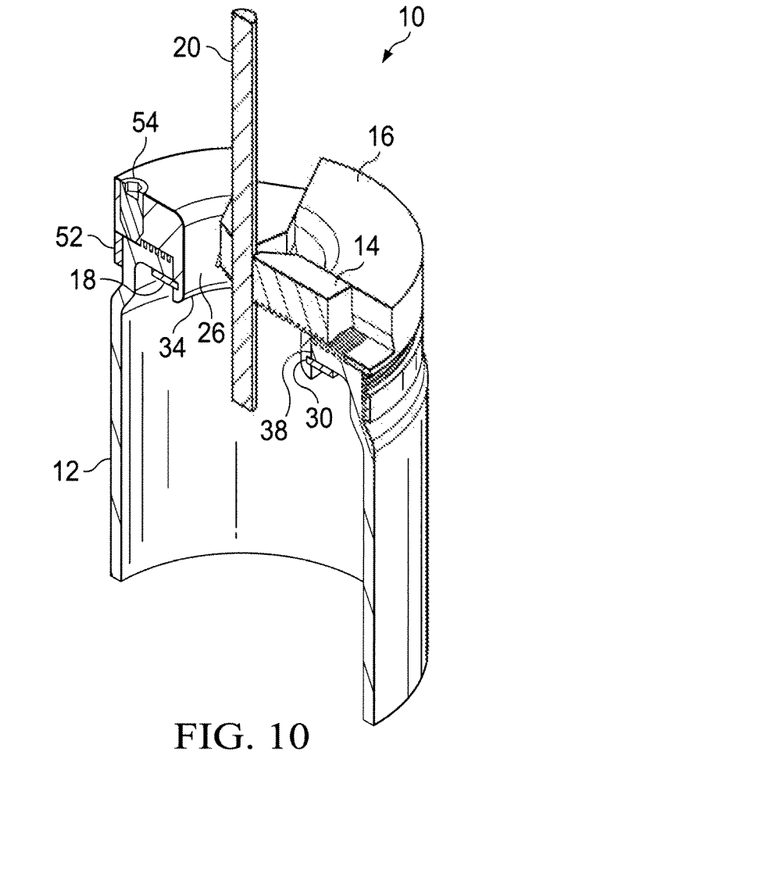
FIG. 10 illustrates a three-dimensional cross-sectional view of the example cable gripping device of FIG. 8, illustrating the locking screw for resisting opening or loosening of the gripping device.

With reference to FIGS. 8 and 10, locking screw 54 may be located in a threaded opening 58 formed in gripping element housing 16. Locking screw 54 may be tightened downwardly into frictional contact with a surface of device body 12, which may act to prevent or resist rotation of gripping element housing 16 relative to device body 12. In some embodiments, the bottom surface of screw 54 and/or corresponding contact surface of body 12 may be roughened, knurled or otherwise contoured to provide increased friction between locking screw 54 and gripping element housing 16.

Figure 11:
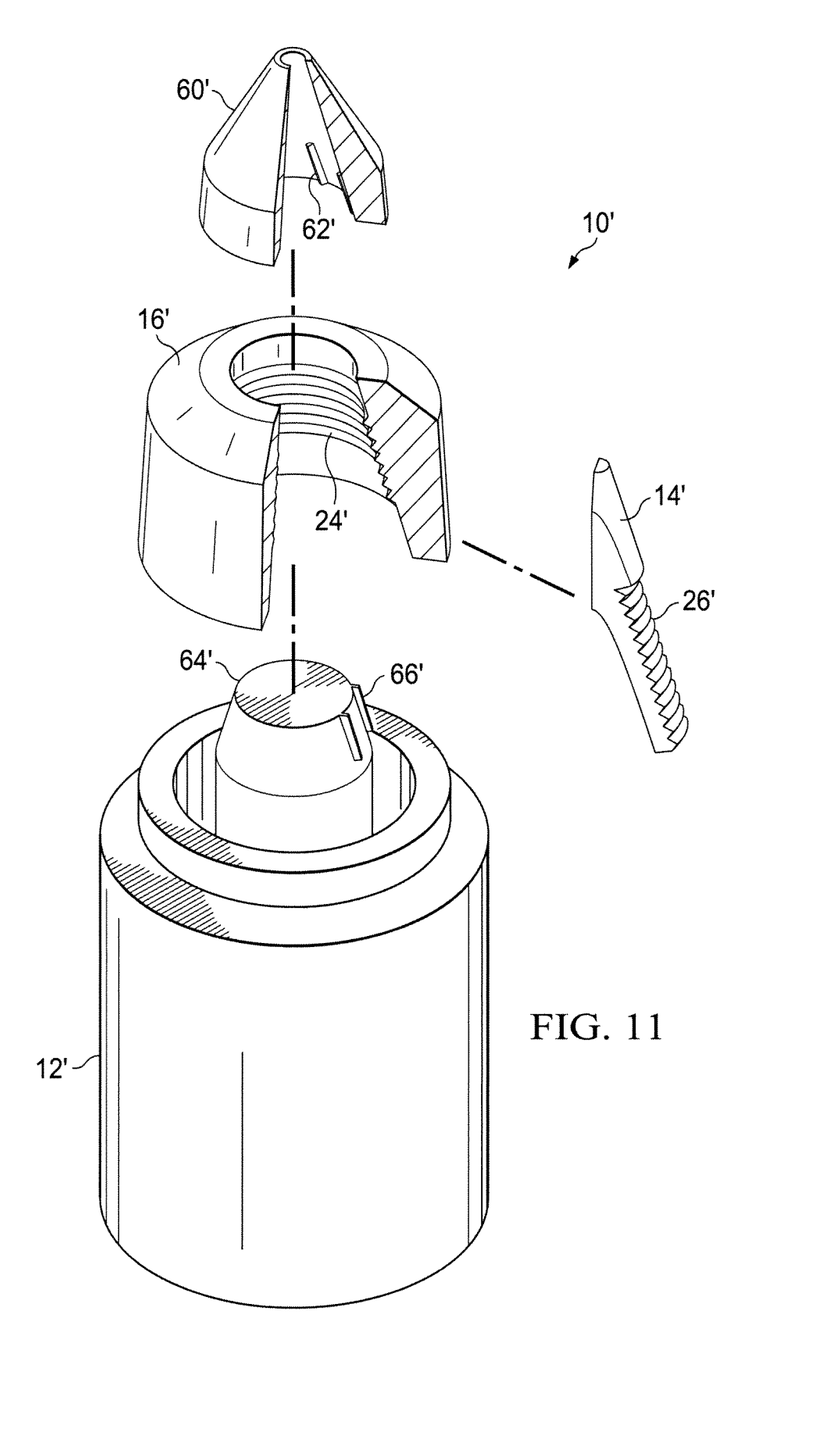
FIG. 11 illustrates an exploded view of another example cable gripping device, which includes gripping elements that move both radially and longitudinally with respect to a longitudinal axis, according to an example embodiment of the disclosure.
Figure 12:
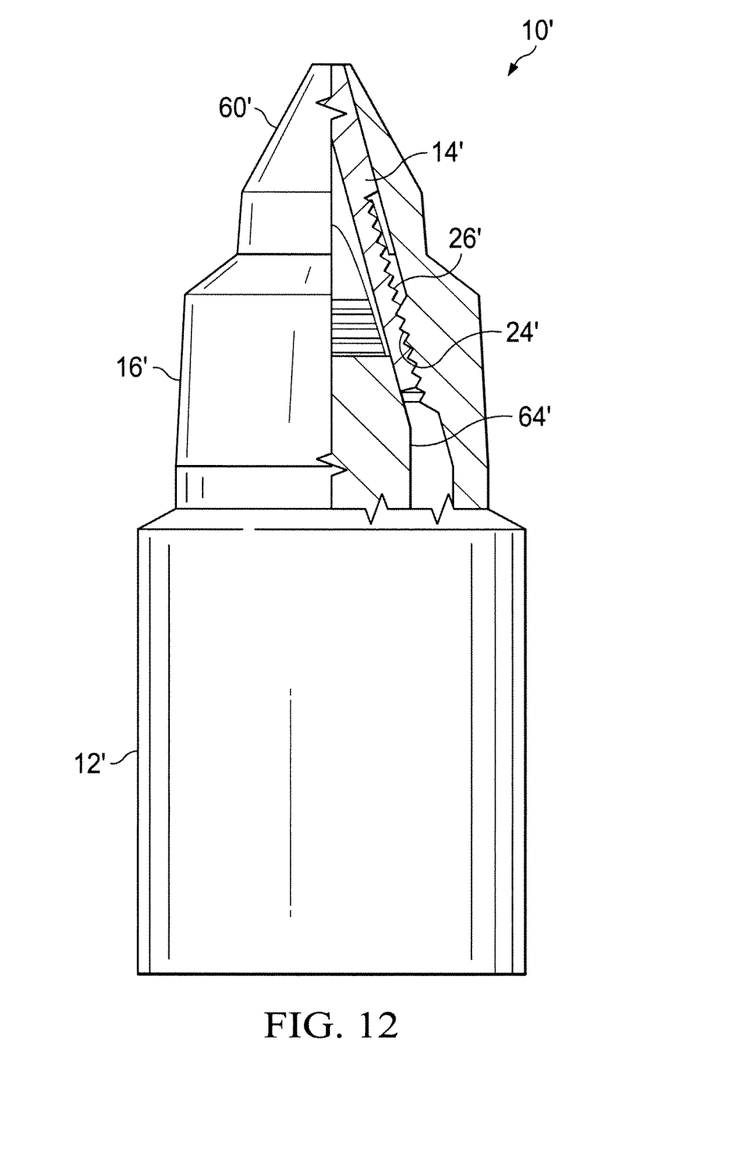
FIG. 12 illustrates a side view with portions removed to show a cross-sectional view of a section of the example cable gripping device of FIG. 8.

FIG. 11 illustrates an exploded view of another example cable gripping device 10', which includes gripping elements 14' that move both radially and longitudinally with respect to a longitudinal axis A', according to an example embodiment of the disclosure. FIG. 12 illustrates a side view of the example device 10' of FIG. 11, with portions removed to show a cross-sectional view of a section of the example device 10'.

In this embodiment, gripping elements 14' may be guided between a conical inner guide structure 64' and an outer housing defined by gripping element housing 16' and a conical guide element 60'. Conical inner guide structure 64' may be integral with, or rigidly coupled to, device body 12'. Conical guide element 60' may be integral with, or rigidly coupled to, device body 12', or alternatively, conical guide element 60' may be rotationally coupled to device body 12'. Conical guide element 60' may also rotate relative to gripping element housing 16'. In another embodiment, gripping element housing 16' and conical guide element 60' may be formed integrally or otherwise rigidly coupled to each other, and rotatably coupled to device body 12'.

As shown, each gripping element 14' may include a threaded surface 26' on a radially outer surface of element 14', which interacts with a corresponding threaded surface 24' on a radially inner surface of gripping element housing 16'.

Threaded surfaces 24' and/or 26' may comprise circular, spiral, or any other types of threads, e.g., as discussed above.

Device 10' may include any suitable number of gripping elements 14', such as in the embodiments discussed above. Device 10' may also include any suitable guide structures or elements to guide the movement of gripping elements 14'. For example, in the illustrated embodiment, guide element 60' may include guide elements 62', and inner guide structure 64' may include guide elements 66', which guide elements 62' and 66' may act to guide gripping elements 14' longitudinally relative to longitudinal axis A' as gripping element housing 16' is rotated relative to device body 12'.

In operation, gripping element housing 16' is rotated relative to device body 12', which causes gripping elements 14' to move both radially and longitudinally with respect to longitudinal axis A', as gripping elements 14' are guided between the guide structures 64', 16', and 60', due to the interaction between threaded surfaces 24' and 26'. In this manner, gripping elements 14' may be tightened around a cable (not shown) positioned between the gripping elements 14'. In some embodiments, device 10' may be hand-tightened and/or may provide a frictional self-locking connection such that when gripping elements 14' are tightened in a first direction, they are prevented or restricted by frictional forces from automatically releasing in the opposite direction (i.e., loosening). Thus, in some embodiments, device 10' may be hand-tightened onto the cable, and remain tight afterwards (i.e., without becoming loosened).

In other embodiments, gripping elements 14', gripping element housing 16', and guide element 60' and 64' may be configured to interact with each other in any other suitable manner in order to provide the desired movement of gripping elements 14'. For example, one or both of guide element 60' and 64' may include threaded surfaces to engage with threads 26' of gripping elements 14'. In such embodiments, threaded surface 24' may be removed from gripping element housing 16', as guide element 60' and/or 64' may provide the needed interaction with gripping elements 14'. It should be understood that any other interaction between gripping elements 14', gripping element housing 16', guide element 60', and/or guide element 64' that would be understood by one of ordinary skill in the art for providing the desired movement of gripping elements 14' may alternatively be provided.

Although the disclosed embodiments are described in detail in the present disclosure, it should be understood that various changes, substitutions and alterations can be made to the embodiments without departing from their spirit and scope.

What is claimed is:

1. A device for gripping a cable, comprising:
   a device body;
   one or more gripping elements movably coupled to the device body;
   a gripping element housing configured to support the one or more gripping elements, the gripping element housing being rotatably coupled to the device body such that rotation of the gripping element housing relative to the device body about a longitudinal axis causes the one or more gripping elements to move radially relative to the longitudinal axis; and
   a locking ring disposed between the device body and the gripping element housing, wherein the locking ring rotatably couples to the device body, wherein the locking ring adjusts to a position that resists rotation of the gripping element housing relative to the device body, wherein the device body and the one or more gripping elements are coupled by a frictional self-locking connection such that when the one or more gripping elements are tightened in a first direction, the one or more gripping elements are restricted by frictional forces from releasing in an opposite direction,
   wherein the device body and the one or more gripping elements are coupled by a threaded connection defined by:
      a threaded surface of the device body, the threaded surface of the device body defining a plane oriented perpendicular to the longitudinal axis; and
      a threaded surface of each gripping element,
      wherein the threaded surface of each gripping element is configured to interact with the threaded surface of the device body such that rotation of the gripping element housing relative to the device body about the longitudinal axis causes the threaded surface of each gripping elements to slide along the threaded surface of the device body, which causes each gripping element to move radially relative to the longitudinal axis.

2. The device according to claim 1, wherein rotation of the gripping element housing relative to the device body about the longitudinal axis causes the one or more gripping elements to move only in a radial direction relative to the longitudinal axis, and not longitudinally relative to the longitudinal axis.

3. The device according to claim 1, including at least three gripping elements spaced apart around a circumference of the gripping element housing.

4. The device according to claim 1, wherein the gripping elements do not rotate relative to the gripping element housing.

5. The device according to claim 1, wherein the threaded surface of the device body defines a spiral thread located in the plane perpendicular to the longitudinal axis.

6. The device according to claim 1, wherein the threaded surface of each gripping element defines a spiral thread located in the plane perpendicular to the longitudinal axis.

7. The device according to claim 1, further comprising a securing ring configured to be received in a securing ring groove formed in the gripping element housing in order to secure the gripping element housing to the device body.

8. The device according to claim 1, wherein at least one gripping element includes a piercing member configured to pierce an outer coating of a cable upon tightening of the one or more gripping elements around the cable.

9. The device according to claim 1, further including a locking screw coupled to the gripping element housing, the locking screw configured for adjustment to a position that resists rotation of the gripping element housing relative to the device body.

10. The device according to claim 9, wherein the locking screw is located in a threaded opening formed in the gripping element housing.

11. The device according to claim 10, wherein the locking screw comprises a bottom surface having a contour that provides increased friction between the locking screw and the gripping element housing.

12. The device according to claim 1, wherein the threaded connection provides the frictional self-locking connection, wherein the first direction is an inward direction, and wherein the opposite direction is an outward direction.

13. The device according to claim 1, wherein the locking ring comprises a threaded inner surface that couples to a threaded outer surface of the device body.

14. The device according to claim 1, wherein the one or more gripping elements, when contacting the cable, leave the cable substantially undamaged.

15. The device according to claim 1, wherein the one or more gripping elements are moved relative to the device body without tools.

16. A device for gripping a cable, comprising:
a device body;
one or more gripping elements movably coupled to the device body;
a gripping element housing configured to support the one or more gripping elements, the gripping element housing being rotatably coupled to the device body such that rotation of the gripping element housing relative to the device body about a longitudinal axis causes the one or more gripping elements to move radially relative to the longitudinal axis;
a locking ring disposed between the device body and the gripping element housing, wherein the locking ring rotatably couples to the device body, wherein the locking ring adjusts to a position that resists rotation of the gripping element housing relative to the device body; and
a securing ring configured to be received in a securing ring groove formed in the gripping element housing in order to secure the gripping element housing to the device body,
wherein the device body and the one or more gripping elements are coupled by a frictional self-locking connection such that when the one or more gripping elements are tightened in a first direction, the one or more gripping elements are restricted by frictional forces from releasing in an opposite direction.

17. A device for gripping a cable, comprising:
a device body;
one or more gripping elements movably coupled to the device body;
a gripping element housing configured to support the one or more gripping elements, the gripping element housing being rotatably coupled to the device body such that rotation of the gripping element housing relative to the device body about a longitudinal axis causes the one or more gripping elements to move radially relative to the longitudinal axis;
a locking ring disposed between the device body and the gripping element housing, wherein the locking ring rotatably couples to the device body, wherein the locking ring adjusts to a position that resists rotation of the gripping element housing relative to the device body; and
a locking screw coupled to the gripping element housing, the locking screw configured for adjustment to a position that resists rotation of the gripping element housing relative to the device body,
wherein the device body and the one or more gripping elements are coupled by a frictional self-locking connection such that when the one or more gripping elements are tightened in a first direction, the one or more gripping elements are restricted by frictional forces from releasing in an opposite direction.

* * * * *